(12) United States Patent
Carralero et al.

(10) Patent No.: US 9,103,968 B2
(45) Date of Patent: Aug. 11, 2015

(54) MULTIFUNCTIONAL OPTICAL SENSOR UNIT

(71) Applicant: The Boeing Company, Chicago, IL (US)

(72) Inventors: Michael A. Carralero, Huntington Beach, CA (US); Olav Solgaard, Stanford, CA (US); Xuan Wu, Riverside, CA (US); Bryan Sun Park, Stanford, CA (US)

(73) Assignee: THE BOEING COMPANY, Chicago, IL (US)

( * ) Notice: Subject to any disclaimer, the term of this patent is extended or adjusted under 35 U.S.C. 154(b) by 356 days.

(21) Appl. No.: 13/765,163

(22) Filed: Feb. 12, 2013

(65) Prior Publication Data

US 2014/0226931 A1 Aug. 14, 2014

(51) Int. Cl.
*G02B 6/00* (2006.01)
*G02B 6/10* (2006.01)
*G01D 5/26* (2006.01)

(52) U.S. Cl.
CPC . *G02B 6/10* (2013.01); *G01D 5/268* (2013.01)

(58) Field of Classification Search
None
See application file for complete search history.

(56) References Cited

U.S. PATENT DOCUMENTS

| | | | |
|---|---|---|---|
| 7,526,148 B2 * | 4/2009 | Kilic et al. | 385/12 |
| 7,630,589 B2 * | 12/2009 | Kilic et al. | 385/12 |
| 7,809,219 B2 | 10/2010 | Kilic et al. | |
| 7,920,770 B2 * | 4/2011 | Holzwarth et al. | 385/129 |
| 8,155,492 B2 * | 4/2012 | Hadzialic et al. | 385/129 |
| 8,160,406 B2 | 4/2012 | Kilic et al. | |
| 8,249,400 B2 * | 8/2012 | Kilic et al. | 385/11 |
| 2001/0054681 A1 * | 12/2001 | Hamada | 250/227.11 |
| 2005/0050962 A1 | 3/2005 | Zerwekh et al. | |
| 2005/0157305 A1 | 7/2005 | Yu et al. | |
| 2011/0268384 A1 * | 11/2011 | Akkaya et al. | 385/12 |
| 2012/0045165 A1 | 2/2012 | Carralero et al. | |
| 2014/0111789 A1 * | 4/2014 | Carralero et al. | 356/35.5 |

FOREIGN PATENT DOCUMENTS

| | | |
|---|---|---|
| EP | 2662676 A2 | 11/2013 |
| EP | 2725333 A2 | 4/2014 |
| WO | WO2007045028 A1 | 4/2007 |

OTHER PUBLICATIONS

Extended European Search Report, dated Oct. 17, 2014, regarding Application No. EP14153857.9, 8 pages.
Park et al., "Photonic Crystal Fiber Tip Sensor for High-Temperature Measurement," IEEE Sensors Journal, vol. 11, No. 11, Nov. 2011, pp. 2643-2648.
Jung et al., "Highly Sensitive Monolithic Silicon Photonic Crystal Fiber Tip Sensor for Simultaneous Measurement of Refractive Index and Temperature," Journal of Lightwave Technology, vol. 29, No. 9, May 2011, pp. 1367-1374.

(Continued)

*Primary Examiner* — Sung Pak
(74) *Attorney, Agent, or Firm* — Yee & Associates, P.C.

(57) ABSTRACT

A method and apparatus for detecting a group of parameters. An optical signal is sent into an optical sensor unit comprising a first reflective structure, a second reflective structure, and a cavity system located between the first reflective structure and the second reflective structure. The first reflective structure is configured to be associated with an optical fiber. A response generated by the optical sensor unit is detected. The group of parameters is identified from the response.

20 Claims, 13 Drawing Sheets

(56) References Cited

OTHER PUBLICATIONS

Kilic et al., "Miniature Photonic-Crystal Hydrophone Optimized for Ocean Acoustics," Journal of the Acoustical Society of America, vol. 129, No. 4, Apr. 2011, pp. 1837-1850.

Kilic et al., "External Fibre Fabry-Perot Acoustic Sensor Based on a Photonic-Crystal Mirror," IOP Publishing, Measurement Science and Technology, vol. 18, No. 12, Sep. 2007, pp. 3049-3054.

Park et al., "Double-Layer Silicon Photonic Crystal Fiber Tip Sensor," International Conference on Optical MEMS and Nanophotonics, Aug. 2011, pp. 97-98.

Akkaya et al., "Fabry-Perot Fiber Sensors with Reproducible Displacement Sensitivities," International Conference on Optical MEMS and Nanophotonics, Aug. 2011, pp. 191-192.

Kilic et al., "Fiber-Optical Acoustic Sensor Based on a Photonic-Crystal Diaphragm," The 15th International Conference on Solid-State Sensors, Actuators and Microsystems, Jun. 2009, pp. 1142-1145.

Kilic et al., "External Fiber Fabry-Perot Acoustic Sensor Based on Photonic-Crystal Mirror," 18th International Conference on Optical Fiber Sensors Topical Meeting, Oct. 2006, 4 pages.

Mallick et al., "Multilayered Monolithic Silicon Photonic Crystals," IEEE Photonics Technology Letters, vol. 23, No. 11, Jun. 2011, pp. 730-732.

Hadzialic et al., "Two-Dimensional Photonic Crystals Fabricated in Monolithic Single-Crystal Silicon," IEEE Photonics Technology Letters, vol. 22, No. 2, Jan. 2010, pp. 67-69.

Mallick et al., "Double-Layered Monolithic Silicon Photonic Crystals," Conference on Lasers and Electro-Optics, May 2008, 2 pages.

Hadzialic et al., "Monolithic Photonic Crystals," IEEE/LEOS Annual Meeting Conference, Oct. 2007, pp. 341-342.

\* cited by examiner

US 9,103,968 B2

MULTIFUNCTIONAL OPTICAL SENSOR UNIT

BACKGROUND INFORMATION

1. Field

The present disclosure relates generally to sensors and, in particular, to optical sensors. Still more practically, the present disclosure relates to a method and apparatus for an optical sensor for detecting multiple types of parameters.

2. Background

Many different types of sensors may be used to detect a physical quantity and generate a signal with information about the physical quantity detected. The physical quantity may also be referred to as a parameter. For example, electrical sensors have been commonly used to detect parameters, such as temperature, pressure, and other types of physical quantities. For example, an electrical sensor may be used to detect temperature and pressure within an interior of the fuel tank of an aircraft.

When electrical sensors are used within a fuel tank, wires connecting the sensors to power and other devices in the aircraft extend into the fuel tank through openings formed in the fuel tank. These openings are sealed to prevent fuel from exiting the fuel tank. In detecting parameters such as fuel level, temperature, pressure, and other parameters, wires are used for each of the types of sensors located within the fuel tank.

With the use of electrical sensors, challenges with respect to shielding and grounding are present. Providing shielding for sensors such that the sensors may operate in a desired manner without causing an undesired condition in the fuel tank is desirable but challenging at times. These challenges increase with the use of composite materials. For example, when a fuel tank is formed from a composite material, shielding is more limited as compared to fuel tanks formed of metal materials. With a composite fuel tank, the inherent shielding and protection of a metal wall in a metal fuel tank is reduced or unavailable. As a result, additional systems are needed for a desired use and operation of an electrical sensor system.

Further, the size of electrical sensors may be larger than desired. For example, a capacitive sensor for detecting a level fuel in the fuel tank may be more complex than desired.

Issues with the use of electrical sensors may also be present for other locations in aircraft. As an example of an issue with respect to the use of electrical sensors in an engine of an aircraft, the heat generated by the engine of an aircraft may present challenges with respect to electrical sensors operating with a desired level of performance.

As a result, the space by the electrical sensors and associated devices, installation time, and other factors may be greater than desired. Therefore, it would be desirable to have a method and apparatus that takes into account at least some of the issues discussed above, as well as other possible issues.

SUMMARY

In one illustrative embodiment, an apparatus comprises a first reflective structure, a second reflective structure, and a cavity system located between the first reflective structure and the second reflective structure. The first reflective structure is configured to be associated with an optical fiber.

In another illustrative embodiment, an optical sensor unit comprises a first photonic crystal mirror, a second photonic crystal mirror, and a sealed cavity located between the first photonic crystal mirror and the second photonic crystal mirror.

In yet another illustrative embodiment, a method for detecting a group of parameters is provided. An optical signal is sent into an optical sensor unit comprising a first reflective structure, a second reflective structure, and a cavity system located between the first reflective structure and the second reflective structure. The first reflective structure is configured to be associated with an optical fiber. A response generated by the optical sensor unit is detected. The group of parameters is identified from the response.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Illustrative embodiments recognize and take into account one or more of different considerations. Illustrative embodiments recognize and take into account that optical sensors may have advantages over electrical sensors. For example, optical sensors that use optical fibers are immune to electromagnetic interference. Additionally, optical sensors may increase the ease for remote sensing and may be smaller as compared to electrical sensors.

The illustrative embodiments also recognize and take into account that with optical sensors, optical fibers may extend through openings into a fuel tank. With optical fibers, issues associated with shielding and grounding are absent.

Illustrative embodiments also recognize and take into account that the number of optical fibers used may be reduced by designing optical sensors that detect multiple parameters. For example, one or more of the illustrative embodiments provide an optical sensor that comprises a sensor unit attached to an end of an optical fiber. The optical sensor unit is configured to detect multiple parameters in the illustrative embodiments.

In one illustrative embodiment, an apparatus comprises a first reflective structure, a second reflective structure, and a cavity system. The first reflective structure is configured to be associated with an optical fiber. The cavity system is located between the first reflective structure and the second reflective structure. These structures form an optical sensor unit in one illustrative example. The optical sensor unit is configured to detect multiple parameters. These parameters may include, for example, at least one of temperature, pressure, and a refractive index.

Figure 1:
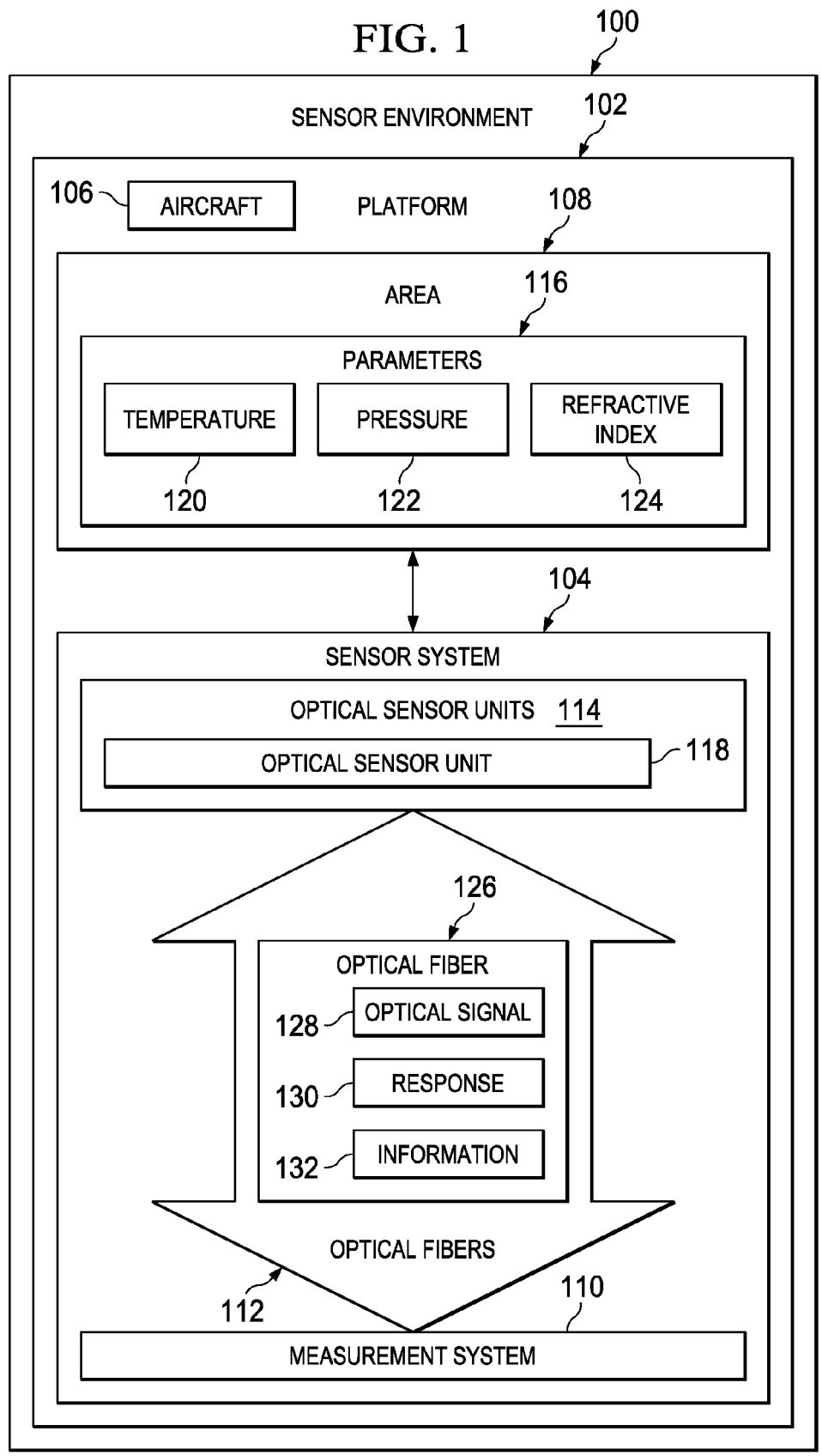
FIG. 1 is an illustration of a block diagram of a sensor environment in accordance with an illustrative embodiment.

With reference now to the figures and in particular with reference to FIG. 1, an illustration of a sensor environment is depicted in accordance with an illustrative embodiment. In this illustrative example, sensor environment 100 includes platform 102. Sensor system 104 is associated with platform 102.

As depicted, platform 102 may be aircraft 106. Of course, platform 102 may take other forms other than aircraft 106. For example, platform 102 may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, or other suitable platforms.

As depicted, sensor system 104 is configured to monitor area 108 in platform 102. Area 108 may take various forms. For example, when platform 102 takes the form of aircraft 106, area 108 may be a fuel tank, an engine, or some other suitable area in aircraft 106.

In this illustrative example, sensor system 104 includes a number of different components. As illustrated, sensor system 104 comprises measurement system 110, optical fibers 112, and optical sensor units 114.

Optical fibers 112 connect optical sensor units 114 to measurement system 110. Optical fibers 112 may be selected from at least one of multimode optical fibers and single mode optical fibers.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

A multimode optical fiber is configured to carry light having more than one mode. A single mode optical fiber is configured to only carry light in a single mode. In these illustrative examples, the mode is a specific manner of propagation for light. For example, the mode may be defined by a spatial shape for the light.

In these illustrative examples, optical sensor units 114 are configured to detect group of parameters 116 in area 108. As used herein, "a group of", when used with reference to items, means one or more items. For example, group of parameters 116 is one or more parameters.

In this illustrative example, optical sensor unit 118 in optical sensor units 114 may be comprised of one or more sensors in which each sensor may detect one or more parameters in group of parameters 116. In detecting group of parameters 116, values for those parameters are identified in the different illustrative examples. As depicted, optical sensor unit 118 is configured to detect at least one of temperature 120, pressure 122, and refractive index 124. In other words, optical sensor unit 118 may be used to detect values for at least one of temperature 120, pressure 122, and refractive index 124. As depicted, other optical sensors in group of optical sensor units 114 may detect the same or other parameters in group of parameters 116. Group of optical sensor units 114 may also be used to detect other parameters. These parameters may include, for example, without limitation, at least one of vibration, acceleration, magnetic force, and other suitable parameters. In this manner, optical sensor unit 118 may function as a multifunctional optical sensor unit.

Optical sensor unit 118 is connected to measurement system 110 by optical fiber 126. As depicted, optical sensor unit 118 is configured to receive optical signal 128 from measurement system 110 over optical fiber 126. Optical signal 128 is light. In this illustrative example, optical signal 128 may have various characteristics that may be selected by measurement system 110. For example, optical signal 128 may have at least one of a particular frequency, intensity, and duration.

In response to receiving optical signal 128, optical sensor unit 118 is configured to generate response 130. Response 130 is light generated from optical signal 128. As depicted, response 130 travels back to measurement system 110 over optical fiber 126. Measurement system 110 is configured to detect response 130. In this illustrative example, response 130 contains information 132. Information 132 is used to identify group of parameters 116.

Figure 2:
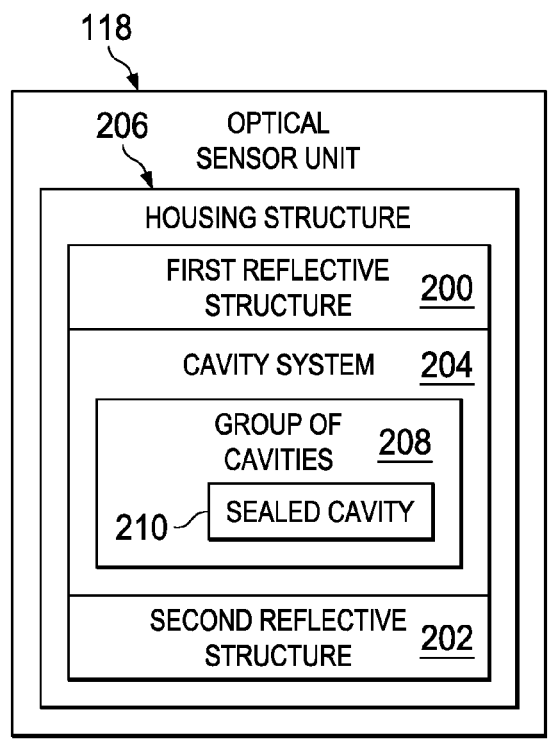
FIG. 2 is an illustration of a block diagram of a sensor unit in accordance with an illustrative embodiment.

With reference now to FIG. 2, an illustration of a block diagram of a sensor unit is depicted in accordance with an illustrative embodiment. In this example, a number of components are illustrated for optical sensor unit 118. As depicted, optical sensor unit 118 comprises first reflective structure 200, second reflective structure 202, and cavity system 204. These different structures are associated with housing structure 206 in this illustrative example. In particular, these different structures may be located on or within housing structure 206.

When one component is "associated" with another component, the association is a physical association in the depicted examples. For example, a first component may be considered to be associated with a second component by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

First reflective structure 200 is configured to be associated with optical fiber 126. In particular, first reflective structure 200 may be associated with the end of optical fiber 126. In this illustrative example, first reflective structure 200 may be, for example, bonded to optical fiber 126, formed as part of optical fiber 126, or connected directly or indirectly in some other manner to optical fiber 126.

In one illustrative example, first reflective structure 200 may be bonded to optical fiber 126 using adhesives or epoxies. In another illustrative example, first reflective structure 200 may be fusion bonded to the optical fiber 126. Further, first reflective structure 200 may also be physically or chemically bonded to optical fiber 126 in yet other illustrative examples.

In this illustrative example, cavity system 204 is located between first reflective structure 200 and second reflective structure 202. For example, first reflective structure 200 may be located on a first side of cavity system 204, while second reflective structure 202 may be located on a second side of cavity system 204 with the first side and second side being opposite of each other. As depicted, cavity system 204 may be comprised of a group of cavities 208.

In these illustrative examples, group of cavities 208 includes sealed cavity 210. Sealed cavity 210 may be sealed against the entry or exit of fluids from sealed cavity 210. Sealed cavity 210 does not prohibit the transmission of optical signal 128 into sealed cavity 210, out of sealed cavity 210, within sealed cavity 210, or some combination thereof.

First reflective structure 200 and second reflective structure 202 may be comprised of a number of different types of materials. For example, first reflective structure 200 and second reflective structure 202 may be each selected from one of a photonic crystal mirror, a layer of metal, a layer of dielectric, a grating, a Bragg grating, a membrane, and other suitable types of reflective structures.

In these illustrative examples, first reflective structure 200 and second reflective structure 202 may allow some or all light in an optical signal to pass through the reflective structures. For example, these reflective structures may allow light of some frequencies to pass through the reflective structures. The amount of light and the frequency of light that may be passed or reflected by the reflective structures may depend on various parameters. For example, pressure, temperature, and other parameters may affect the amount of light and frequency of the light reflected by the reflective structures.

In this illustrative example, the different components are configured to generate information within response 130. For example, first reflective structure 200 is configured to generate information about temperature 120. Cavity system 204 with first reflective structure 200 and second reflective structure 202 are configured to generate information about pressure 122. Second reflective structure 202 is configured to generate information about refractive index 124.

The information in response 130 may be, for example, a frequency of light, an intensity of light, and other characteristics about the light reflected in optical signal 128. Other examples include at least one of frequency shift, phase of light, spectral shape, quality factor (Q) of spectral peaks or valleys, and dispersion of a pulse.

The illustration of sensor environment 100 and the different components in sensor environment 100 in FIG. 1 and FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, other types of sensors may be present in sensor system 104 in addition to optical sensor units 114. For example, wired sensor units also may be present in these illustrative examples. In still other illustrative examples, the group of optical sensor units 114 may not be directly connected to measurement system 110 by optical fibers 112. Instead, optical fibers 112 may be connected to wireless indications units that transmit response 130. Response 130 may be transmitted as an optical signal over air, rather than through an optical fiber. In other illustrative examples, response 130 may be converted into digital or analog form in a signal that is transmitted over a wireless indications link.

In yet another illustrative example, optical sensor unit 118 may have one or more sealed cavities within group of cavities 208 in addition to sealed cavity 210. First reflective structure 200 and second reflective structure 202 may be located on either side of these additional sealed cavities. In yet other illustrative examples, additional reflective structures may be present in addition to first reflective structure 200 and second reflective structure 202.

Figure 3:
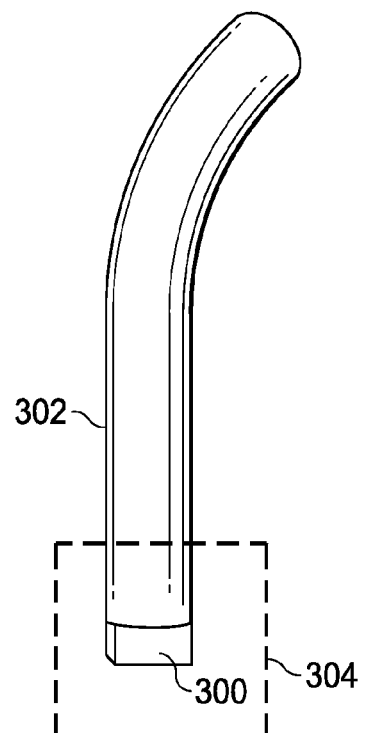
FIG. 3 is an illustration of an optical sensor unit associated with optical fiber in accordance with an illustrative embodiment.

In FIG. 3, an illustration of an optical sensor unit associated with optical fiber is depicted in accordance with an illustrative embodiment. In this illustrative example, optical sensor unit 300 is shown associated with optical fiber 302. Optical sensor unit 300 is an example of one physical implementation for optical sensor unit 118 shown in block form in FIG. 1 and FIG. 2.

In one illustrative example, optical sensor unit 300 associated with optical fiber 302 may be placed in an area of a platform such as a fuel tank or an engine of an aircraft. For example, when optical sensor unit 300 is used in a fuel tank, optical sensor unit 300 may detect temperature, pressure, and refractive index for the fuel tank. The refractive index may be used to identify the composition of the fuel in the fuel tank. For example, the refractive index may be used to determine whether contaminants are present, whether the fuel has a desired level of quality, or some combination thereof. A more detailed view of section 304 is shown and described with reference to FIG. 4 below.

Figure 4:
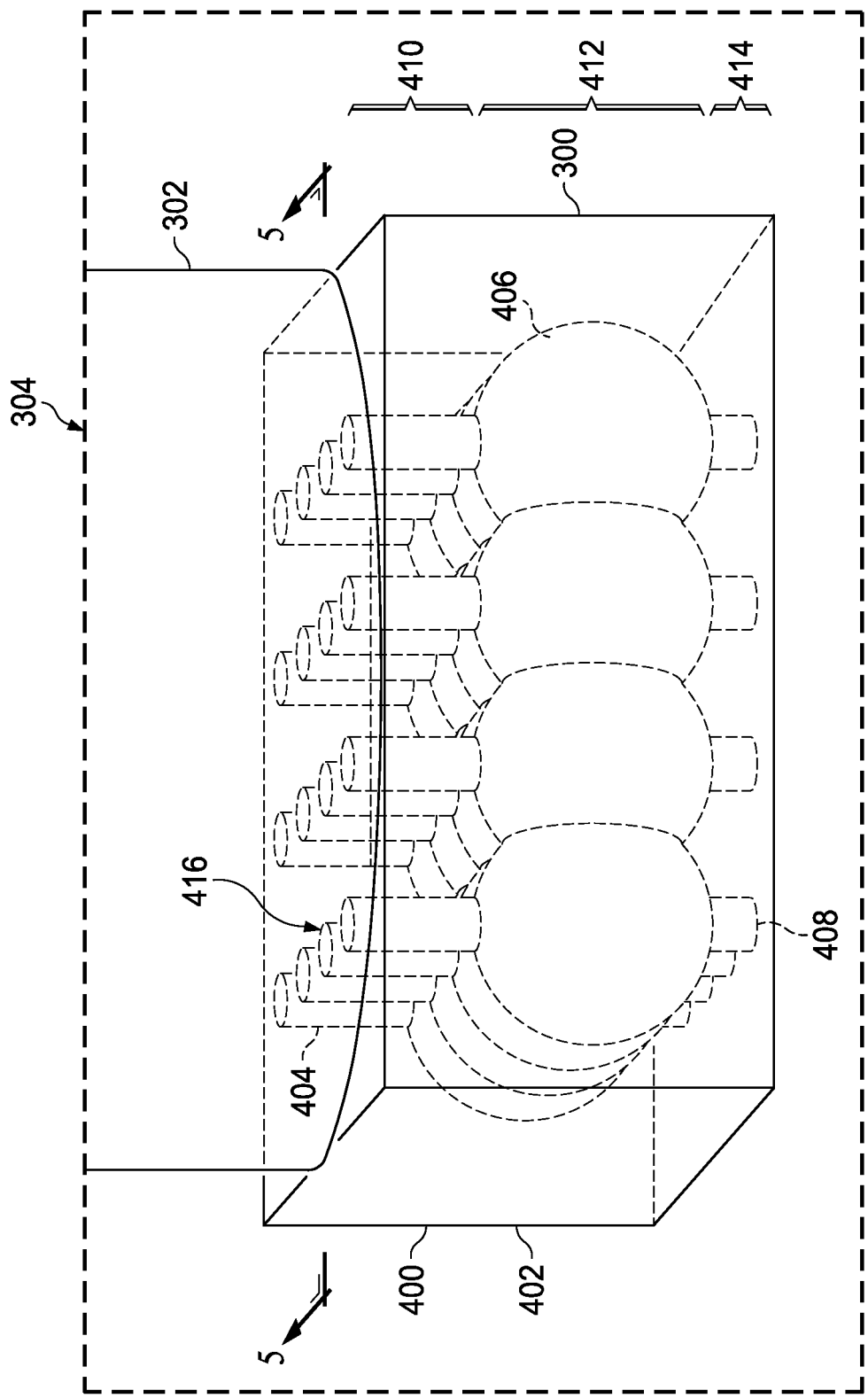
FIG. 4 is a more detailed illustration of a sensor unit associated with an optical fiber in accordance with an illustrative embodiment.

Turning now to FIG. 4, a more detailed illustration of a sensor unit associated with an optical fiber is depicted in accordance with an illustrative embodiment. In particular, a more detailed view of section 304 from FIG. 3 is shown.

As can be seen in this view, optical sensor unit 300 is formed from substrate 400. In this particular example, substrate 400 is a silicon substrate. Of course, other types of substrates may be used depending on the particular implementation. For example, a silicon on insulator (SOI) substrate also may be used as well as other suitable substrates. Substrate 400 forms housing structure 402 for optical sensor unit 300.

In this illustrative example, housing structure 402 has a shape of a cuboid. Cross-section of housing structure 402 has a rectangular shape. Of course, housing structure 402 may have other shapes in other illustrative examples. For example, housing structure 402 may have the shape of a cube, a cylinder, or some other suitable shape depending on the particular implementation.

Different components for optical sensor unit 300 are shown in phantom inside of housing structure 402. Within housing structure 402, first photonic crystal mirror 404, sealed cavity 406, and second photonic crystal mirror 408 can be seen in phantom.

As depicted, first photonic crystal mirror 404 is located in section 410, sealed cavity 406 is located in section 412, and second photonic crystal mirror 408 is located in section 414. These different components provide optical sensor unit 300 with the capability to detect at least one of temperature, pressure, and refractive index.

In this illustrative example, channels 416 are seen in housing structure 402. Although channels 416 are shown with a rectangular grid, other configurations of channels 416 may be present. For example, channels 416 may be arranged as a hexagonal grid.

Figure 5:
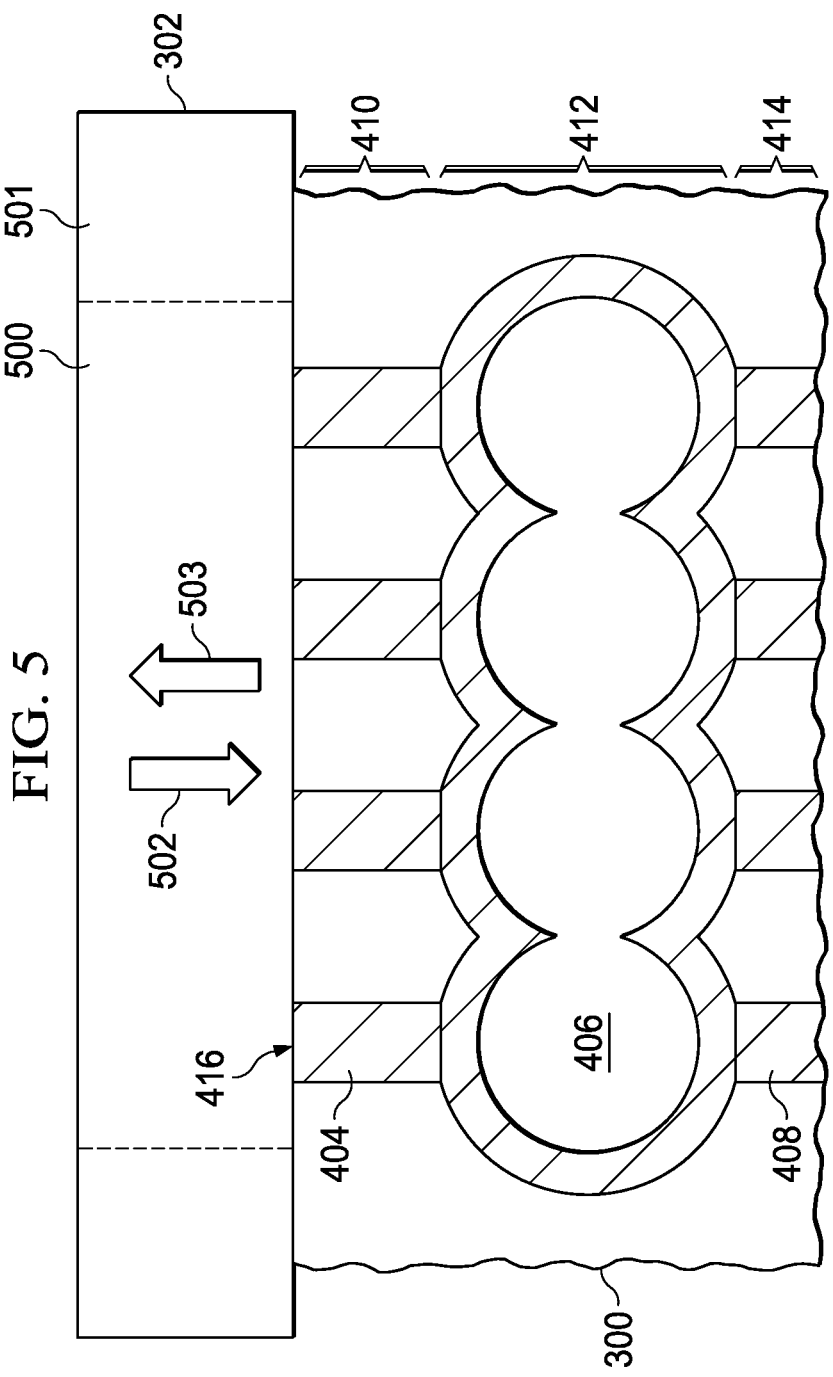
FIG. 5 is an illustration of a cross-sectional view of an optical sensor unit associated with an optical fiber in accordance with an illustrative embodiment.

In FIG. 5, an illustration of a cross-sectional view of an optical sensor unit associated with an optical fiber is depicted in accordance with an illustrative embodiment. A cross-sectional view of optical sensor unit 300 associated with optical fiber 302 in section 304 is seen taken along line 5-5 in FIG. 4.

As depicted, optical sensor unit 300 is associated with core 500 inside of cladding 501 of optical fiber 302. The association is such that optical signal 502 may be transmitted into optical sensor unit 300 and response 503 may be received from optical sensor unit 300.

In this illustrative example, the different components within optical sensor unit 300 function together to provide information about a number of different parameters. In particular, first photonic crystal mirror 404, sealed cavity 406, and second photonic crystal mirror 408 are configured such that changes in these components are reflected in response 503. As a result, response 503 provides information about a combination of parameters such as temperature, pressure, and refractive index.

In some illustrative examples, one or more parts of optical sensor unit 300 may be more sensitive to one or more different parameters than other parts of optical sensor unit 300. As an example, first photonic mirror 404 is more sensitive to changes in temperature because first photonic crystal mirror 404 is encapsulated within optical sensor unit 300. In other words, because of the position of first photonic crystal mirror 404 within optical sensor unit 300, changes to pressure and refractive index outside optical sensor unit 300 may have a negligible effect on first photonic crystal mirror 404.

As another example, sealed cavity 406 is more sensitive to changes in pressure. Sealed cavity 406 may expand and contract as the pressure around the object changes. As yet another example, second photonic crystal mirror 408 is more sensitive to changes in refractive index. Thus, depending on the type of changes occurring with respect to the object, the combination of reflectivities of first photonic crystal mirror 404, sealed cavity 406, and second photonic crystal mirror 408 provide information in response 503 about at least one of temperature, pressure, and refractive index.

In operation, optical signal 502, having a first frequency, may be sent into optical sensor unit 300. Optical signal 502 may be reflected as response 503. The intensity of the light in optical signal 502 that is reflected as response 503 by optical sensor unit 300 may vary depending on the temperature. Additionally, the frequency may also change depending on the temperature. In these illustrative examples, the frequency is the frequency of the spectral content of the light in response 503.

Optical signal 502 may be sent into optical sensor unit 300 having a second frequency that is different from the first frequency. Sealed cavity 406, first photonic crystal mirror 404, and second photonic crystal mirror 408 may generate response 503 that includes information about pressure.

For example, as the pressure on housing structure 402 changes, the size of sealed cavity 406 also may change. The change in the manner in which optical signal 502 is reflected within sealed cavity 406 between first photonic crystal mirror 404 and second photonic crystal mirror 408 may be used to identify the pressure on housing structure 402. In particular, this change may be the intensity of the light in response 503. This change may be used identify the distance between first photonic crystal mirror 404 and second photonic crystal mirror 408. This distance may change as pressure changes. As a result, the distance may be used to identify the pressure.

A third frequency may be selected for optical signal 502 to detect a refractive index of the environment around optical sensor unit 300. The environment around optical sensor unit 300 may be, for example, a fluid. This fluid may be, for example, fuel. In this instance, response 503 from the components in optical sensor unit 300 may contain information needed to identify the refractive index of the fluid.

Figure 6:
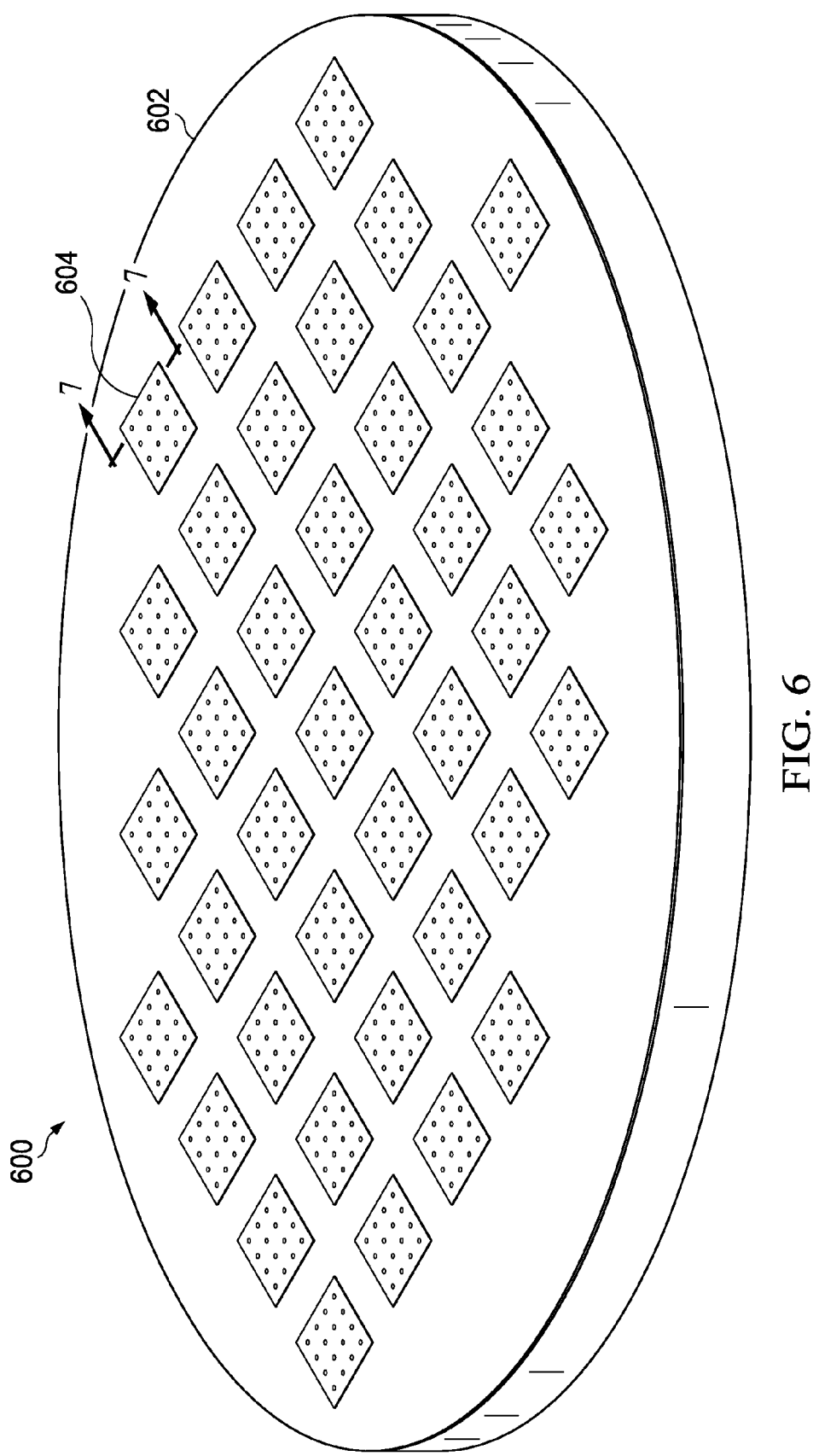
FIG. 6 is an illustration of optical sensor units in a silicon substrate in accordance with an illustrative embodiment.

With reference now to FIG. 6, an illustration of optical sensor units in a silicon substrate is depicted in accordance with an illustrative embodiment. In this illustrative example, optical sensor units 600 are shown in silicon substrate 602. As depicted, silicon substrate 602 takes the form of a silicon wafer.

Optical sensor units 600 may be formed in silicon substrate 602 using currently available semiconductor processing techniques. Optical sensor units 600 may then be separated from silicon substrate 602 and attached to optical fibers.

Optical sensor unit 604 is an example of an optical sensor unit within optical sensor units 600. A more detailed illustration of optical sensor unit 604 is shown in FIG. 7 below.

Figure 7:
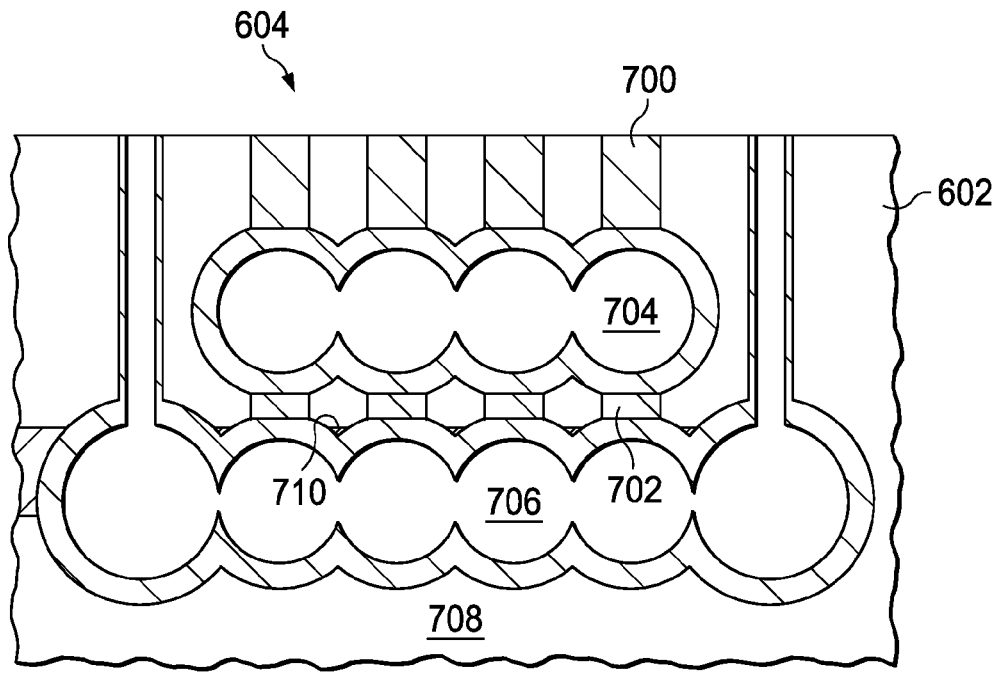
FIG. 7 is an illustration of a cross-sectional view of an optical sensor unit in a wafer in accordance with an illustrative embodiment.

In FIG. 7, an illustration of a cross-sectional view of an optical sensor unit in a wafer is depicted in accordance with an illustrative embodiment. In this illustration, a cross-sectional view of optical sensor unit 604 is shown taken along line 7-7 in FIG. 6.

In this cross-sectional view, optical sensor unit 604 has first photonic crystal mirror 700, second photonic crystal mirror 702, and sealed cavity 704. Also seen in this cross-sectional view is release cavity 706 and portion 708.

In the illustrative example, release cavity 706 and portion 708 in silicon substrate 602 are not part of optical sensor unit 604. Instead, these components are used to fabricate optical sensor unit 604 using semiconductor processes. Portion 708 is discarded or removed when separating optical sensor unit 604 from silicon substrate 602. As a result, surface 710 forms an outer surface for optical sensor unit 604 when optical sensor unit 604 is removed from silicon substrate 602.

With reference to FIGS. 8-14, illustrations of cross-sectional views for a process for fabricating an optical sensor unit on a silicon substrate is depicted in accordance with an illustrative embodiment. In this illustrative example, the forming of the optical sensor unit is performed using reactive ion etching (RIE).

Figure 8:
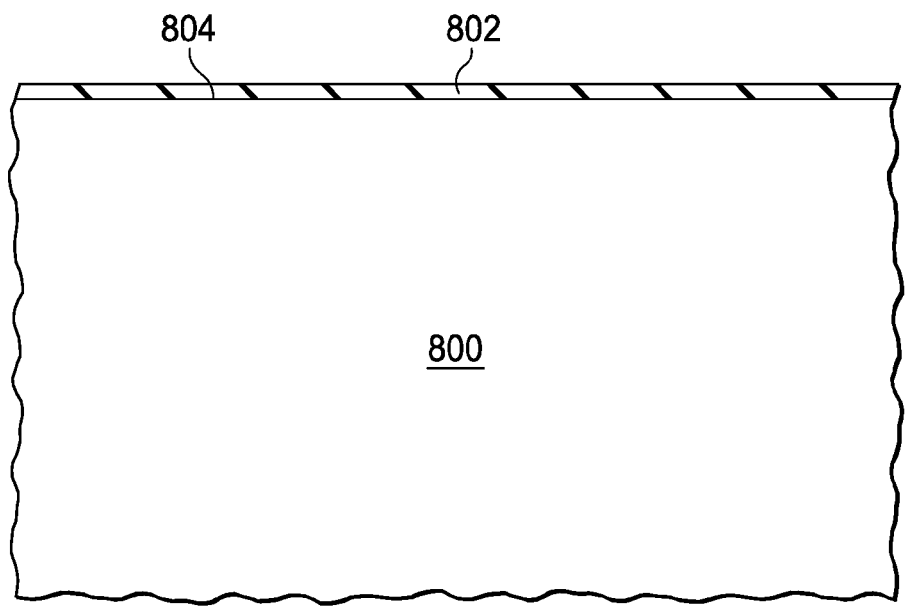
FIGS. 8-14 are illustrations of cross-sectional views for a process for fabricating an optical sensor unit on a silicon substrate in accordance with an illustrative embodiment.

In FIG. 8, a cross-sectional view of a substrate with a thermal oxide layer is depicted in accordance with an illustrative embodiment. In this depicted example, silicon substrate 800 is shown with thermal oxide layer 802 formed on surface 804 of silicon substrate 800. In this illustrative example, thermal oxide layer 802 is about 700 nm thick. Silicon substrate 800 may be a standard silicon wafer which is about 400 um to about 500 um thick. In other illustrative examples, silicon substrate 800 may be a silicon wafer from about 200 um to about 1 mm thick. For example, if silicon substrate 800 is a 4 in silicon wafer, the thickness may be from about 300 um to about 600 um.

Figure 9:
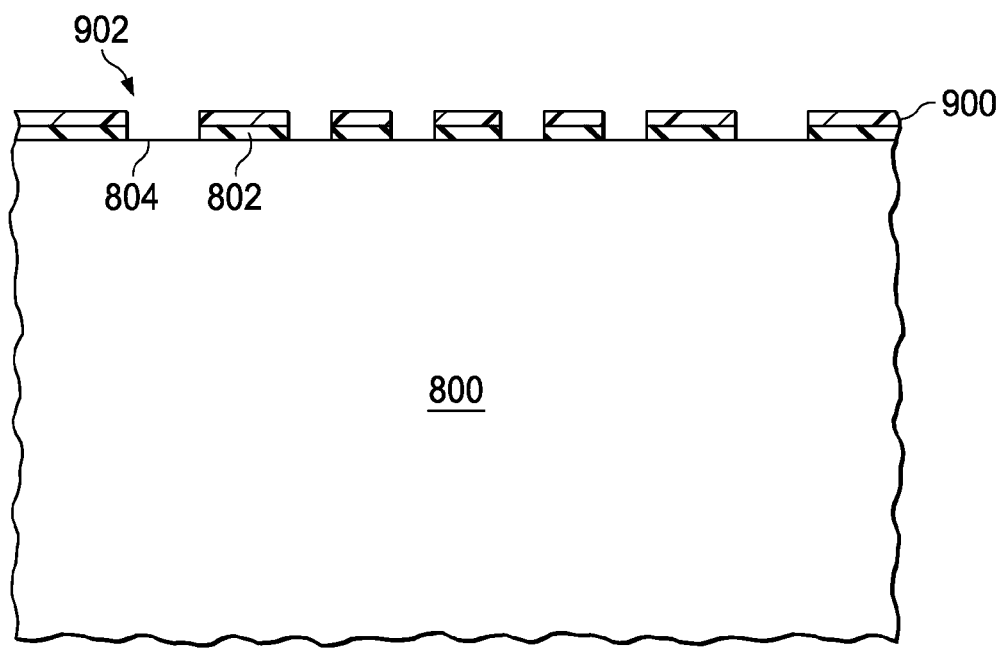

Next, in FIG. 9, a cross-sectional view of a substrate with patterned photoresist is depicted in accordance with an illustrative embodiment. In this illustrative example, photoresist layer 900 has been formed on thermal oxide layer 802. As depicted, photoresist layer 900 is about 700 nm thick.

In addition, photoresist layer 900 is shown in a patterned form. The pattern in photoresist layer 900 includes openings 902. Openings 902 expose portions of thermal oxide layer 802 for etching. In this illustrative example, thermal oxide layer 802 is already etched and exposes portions of surface 804 of silicon substrate 800. In this illustrative example, an opening in openings 902 may be spaced apart from another opening by distance of about 820 nm from center to center.

Portions of thermal oxide layer 802 are removed where openings 902 are present. In this illustrative example, reactive ion etching (RIE) is used to remove this portion of thermal oxide layer 802. The removal of the portions of thermal oxide layer 802 exposes portions of surface 804 of silicon substrate 800. Photoresist layer 900 is removed after portions of surface 804 of silicon substrate 800 have been exposed.

Figure 10:
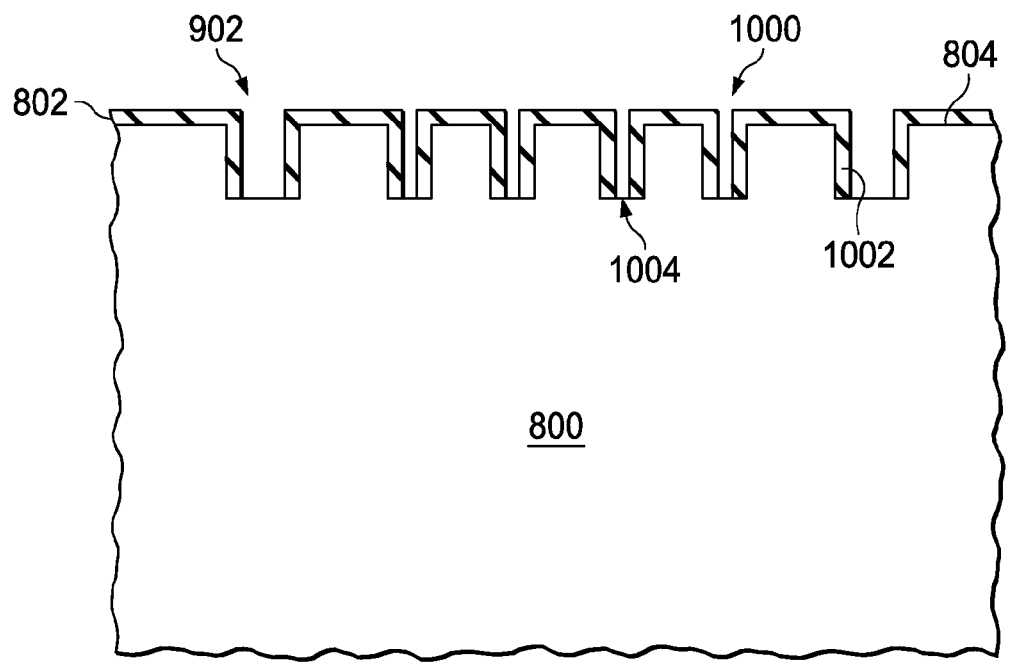

In FIG. 10, reactive ion etching (RIE) has been performed on the exposed portions of surface 804 of silicon substrate 800. The result is channels 1000 that extend into silicon substrate 800. Thermal oxidation is performed to form thermal oxide layer 1002 on the walls of channels 1000. In the illustrative example, the thickness of the thermal oxide on the walls of channels 1000 is about 70 nm.

Further, only four channels are shown in this cross-sectional view of channels 1000 for the purpose of more clearly illustrating how different structures are manufactured. Additional channels are not shown to avoid obscuring the illustration of how different structures are fabricated for an optical sensor unit. In fact, in an actual optical sensor unit, thousands of channels may be present. For example, channels 1000 may be arranged in a grid of 200×200 channels. Thus, the cross-section in this example has 200 channels.

As depicted, portions of thermal oxide layer 1002 have been removed from bottom side 1004 of channels 1000. The removal of these portions exposes silicon substrate 800 on bottom side 1004 of channels 1000. In the illustrative example, channels 1000 may have a diameter of about 500 nm. The diameter of channels 1000 may be selected such that channels 1000 may be sealed using thermal oxidation.

Figure 11:
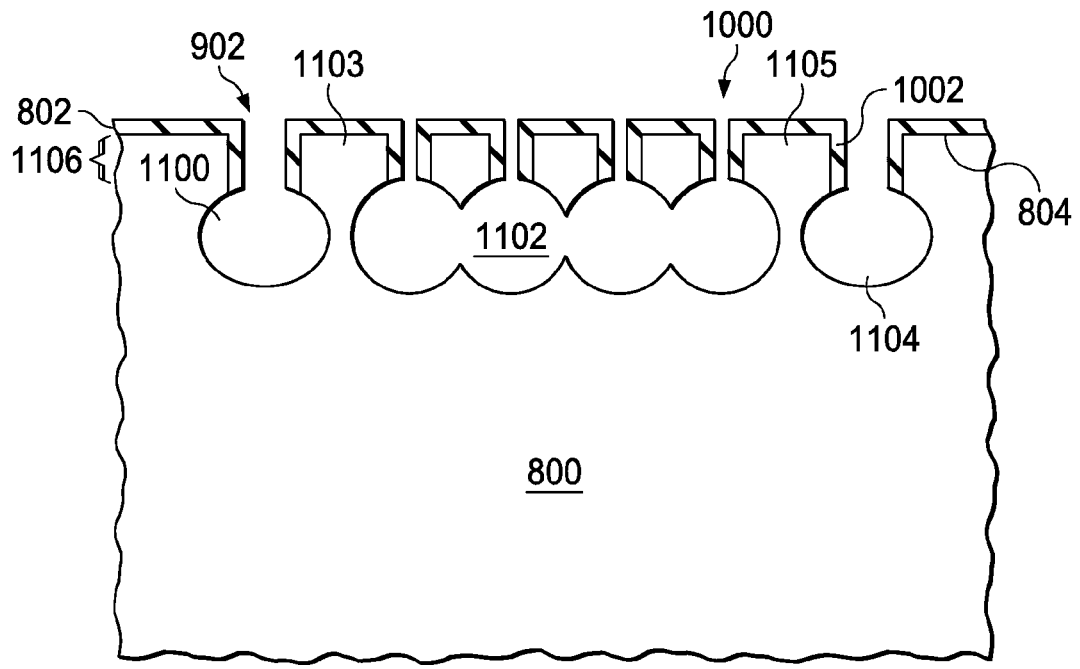

In FIG. 11, a reactive ion etch is performed to extend channels 1000 further into silicon substrate 800. Extended portions (not shown) do not have thermal oxide layer 1002.

Thereafter, an isotropic undercut etch is performed using $SF_6$ in this illustrative example. Of course, the isotropic undercut etch may be performed using other chemicals, depending on the particular implementation. For example, $CF_4$ may also be used. These steps result in the formation of cavity 1100, cavity 1102, and cavity 1104. Layer 1106 is located above cavity 1102. Layer 1106 has a thickness of about 500 nm. Layer 1106 is the section that will form the first mirror. When fabrication is complete, the membrane is suspended on silicon substrate 800. Layer 1106, the area above cavity 1102, is a photonic crystal membrane in this illustrative example. Layer 1106 is attached to silicon substrate 800 by the two sides. The sides are pillar structure 1103 and pillar structure 1105. Pillar structure 1103 is located between cavity 1100 and cavity 1102. Pillar structure 1105 is located between cavity 1102 and cavity 1104. Even though the cross-section shows two pillars, it's actually a ring in the 3D structure. The ring can be any enclosed polygon, though it's most commonly a circle or a square.

Figure 12:
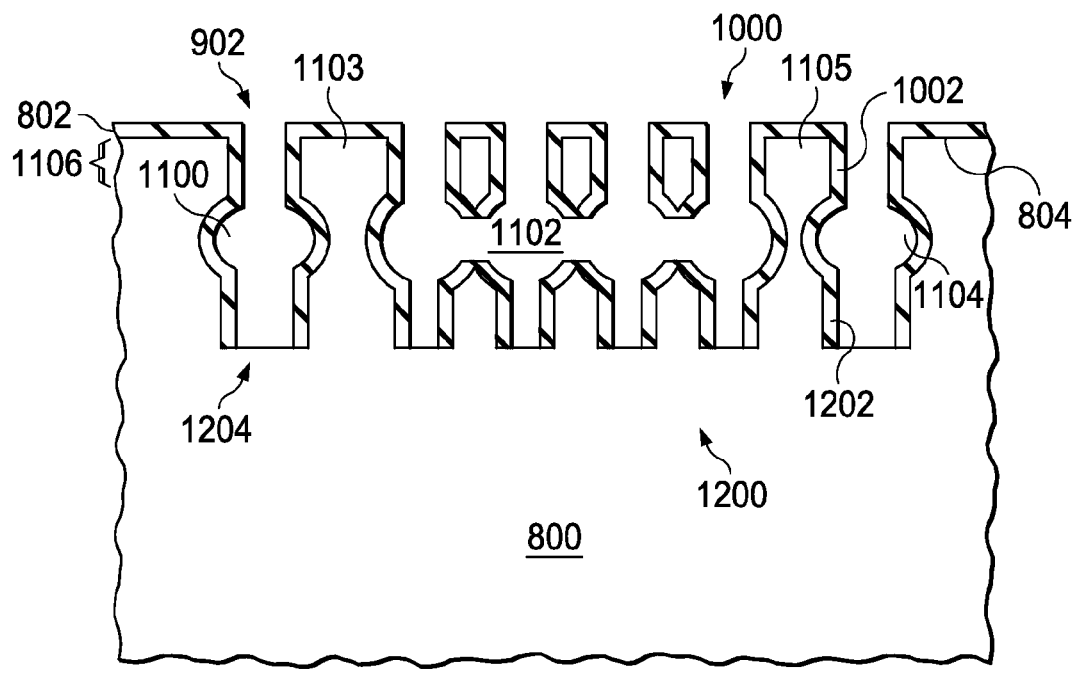

Next, in FIG. 12, channels 1200 have been etched into silicon substrate 800 and thermal oxide layer 1202 has been formed on the walls of channels 1200. Additionally, thermal oxide layer 1202 has also been formed in cavity 1100, cavity 1102, and cavity 1104. In this illustrative example, each of channels 1200 has a diameter of about 400 nm or less. In a similar fashion, portions of thermal oxide layer 1202 have been removed from bottom side 1204 of the walls of channels 1200.

Figure 13:
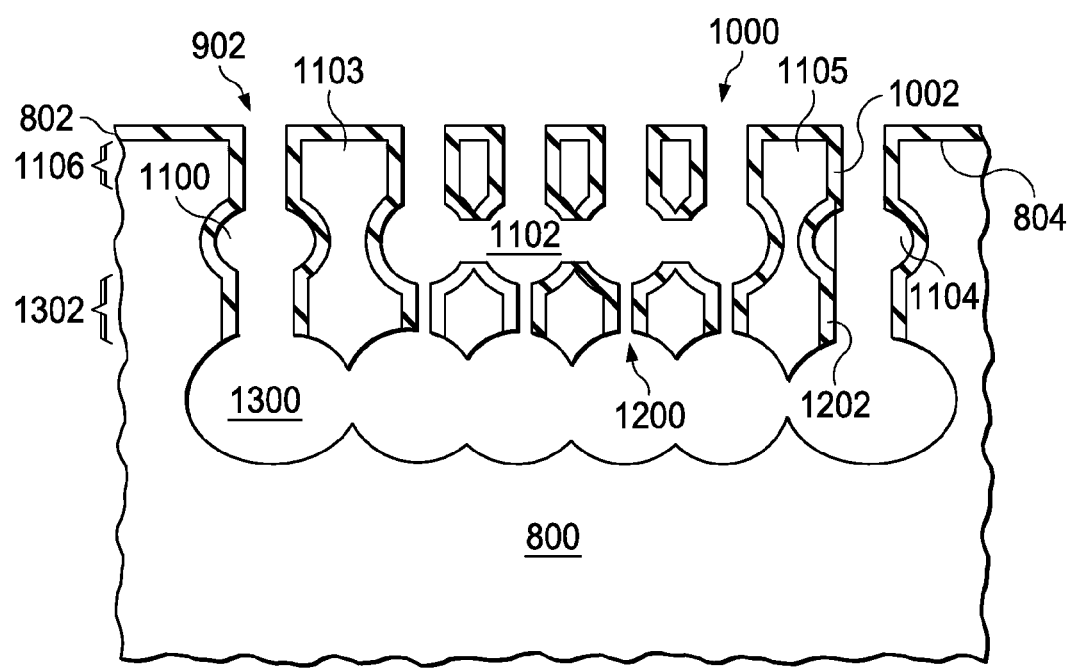

Turning to FIG. 13, an isotropic undercut etch is performed in accordance with an illustrative embodiment. In particular, reactive ion etching is performed to extend channels 1200. The extension of channels 1200 do not have thermal oxide layer 1202.

Thereafter, the isotropic undercut etch may be performed using $XeF_2$ and results in the formation of cavity 1300. Of course, other chemicals may be used to perform the isotropic undercut edge. For example, $CF_4$ and $SF_6$ also may be used. In this illustrative example, layer 1302 is located between cavity 1102 and cavity 1300. Layer 1302 has a thickness of about 400 nm and is the section that will form the section for the second photonic crystal mirror when processing is complete in this illustrative example.

Figure 14:
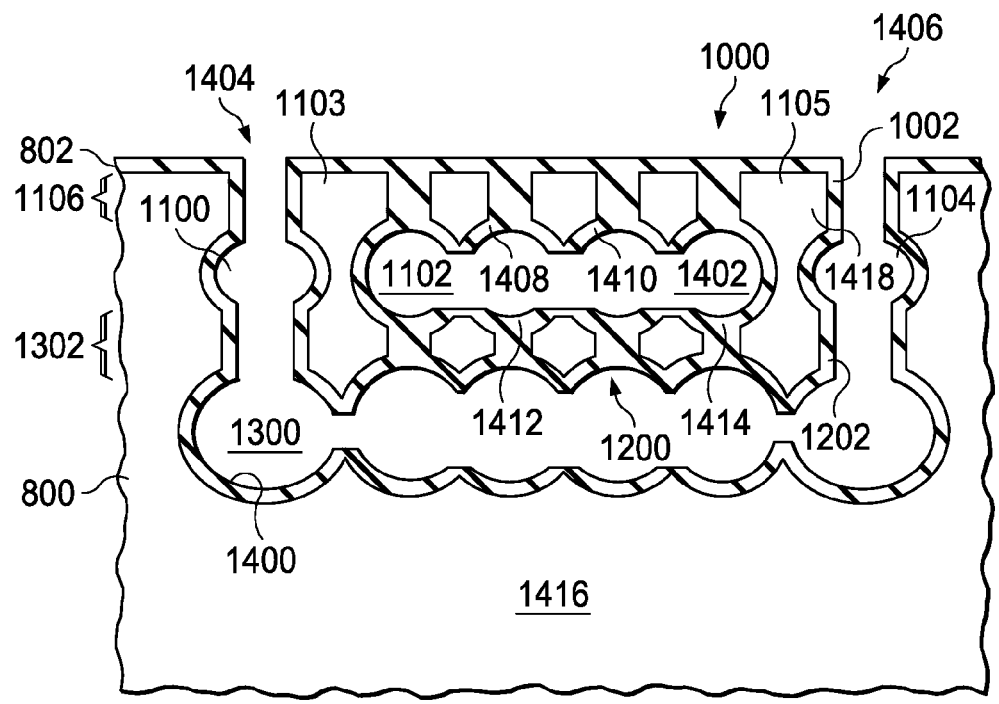

Next, in FIG. 14, thermal oxide layer 1400 is formed in cavity 1300. The formation of thermal oxide also seals channels 1000 and the portion of channels 1200 that are connected to cavity 1102. Thus, the formation of thermal oxide is such that cavity 1102 becomes sealed cavity 1402 in this illustrative example. As depicted, cavity 1300 is in communication with cavity 1100 and cavity 1104. Cavity 1100 is in communication with channel 1404 in layer 1106 and cavity 1104 is in communication with channel 1406 in layer 1106. This configuration aids in sealing cavity 1102 to form sealed cavity 1402.

As can be seen, layer 1106 includes thermal oxide layer 802, silicon substrate 800 within layer 1106, channels 1000 filled with thermal oxide, and thermal oxide layer 1408 formed on topside 1410 of sealed cavity 1402. Layer 1302 includes thermal oxide layer 1412 on bottom side 1414 of sealed cavity 1402, channels 1200 filled with thermal oxide, and silicon substrate 800.

These layers, however, do not include portion 1416. Portion 1416 is a removable portion and may be removed to form optical sensor unit 1418.

The illustrations of the different cross-sections and descriptions of the steps for forming an optical sensor unit are not meant to show every step in fabricating an optical sensor unit on a silicon substrate. The different cross-sections shown are meant to illustrate some of the steps used to manufacture the optical sensor unit. For example, a cross-sectional view of unpatterned photoresist was not shown. Further, the different structures shown in the cross-sectional views are not meant to be proportional or show actual dimensions of the optical sensor unit.

As another illustrative example, the different steps depicted may also be used with other substrates other than a silicon substrate. For example, silicon on insulator (SOI) substrate may be used.

Figure 15:
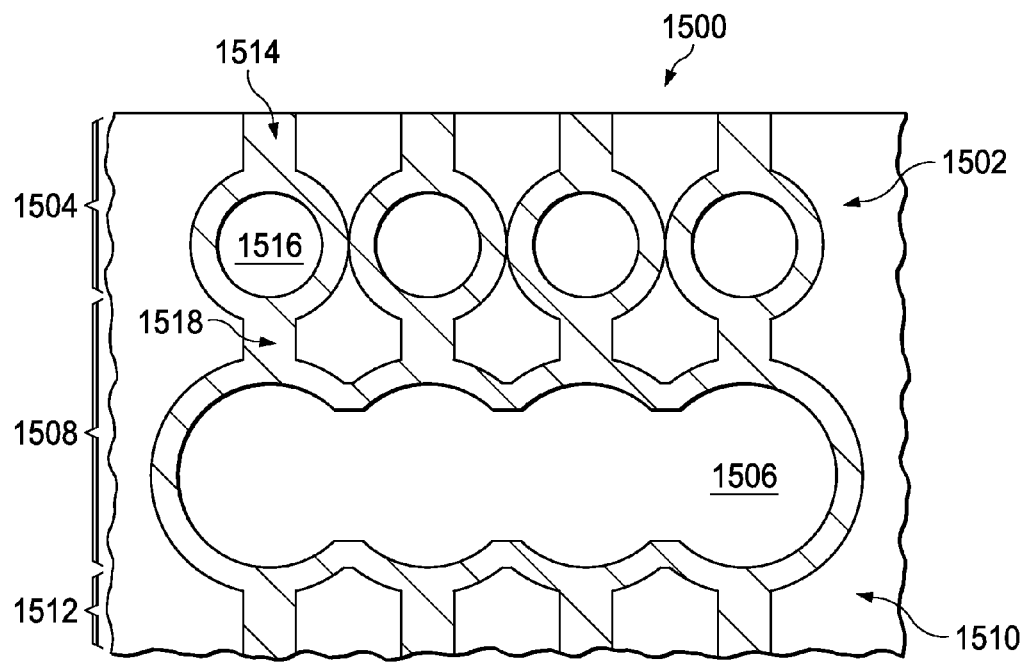
FIG. 15 is an illustration of a cross-sectional view of an optical sensor unit in accordance with an illustrative embodiment.

With reference next to FIG. 15, an illustration of a cross-sectional view of an optical sensor unit is depicted in accordance with an illustrative embodiment. Optical sensor unit 1500 is an example of one physical implementation for optical sensor unit 118 in FIG. 1. In this illustrative example, optical sensor unit 1500 has first reflective structure 1502 in section 1504, sealed cavity 1506 in section 1508, and second reflective structure 1510 in section 1512.

As seen in this example, first reflective structure 1502 includes channels 1514, cavities 1516, and channels 1518. These three layers may provide increased reflectivity. Additionally, the configuration of these three layers may increase the sensitivity of optical sensor unit 1500 with respect to detecting temperature and pressure.

Figure 16:
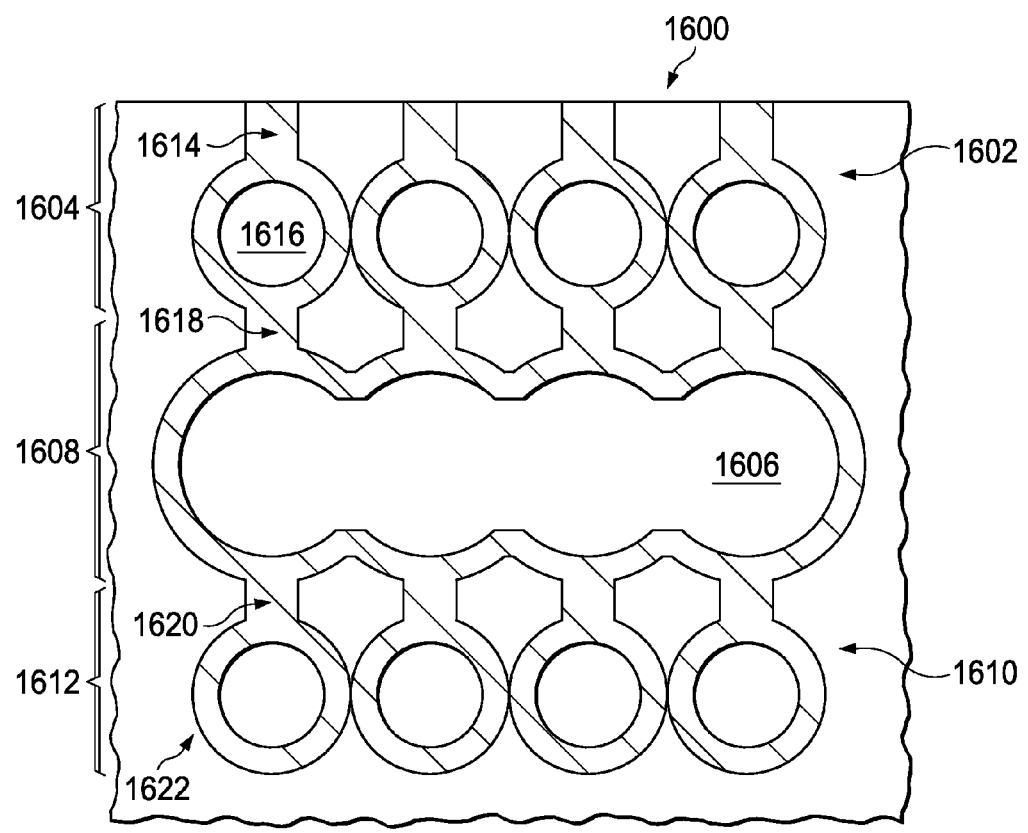
FIG. 16 is another illustration of a cross-sectional view of an optical sensor unit in accordance with an illustrative embodiment.

With reference next to FIG. 16, another illustration of a cross-sectional view of an optical sensor unit is depicted in accordance with an illustrative embodiment. Optical sensor unit 1600 is an example of one physical implementation for optical sensor unit 118 in FIG. 1. In this illustrative example, optical sensor unit 1600 has first reflective structure 1602 in section 1604, sealed cavity 1606 in section 1608, and second reflective structure 1610 in section 1612.

As seen in this illustrative example, first reflective structure 1602 has channels 1614, cavities 1616, and channels 1618 that are arranged in three layers. Additionally, second reflective structure 1610 has channels 1620 and cavities 1622 arranged in two layers. These two layers may provide increased sensitivity in detecting a parameter. For example, these two layers may provide increased sensitivity in detecting pressure.

Figure 17:
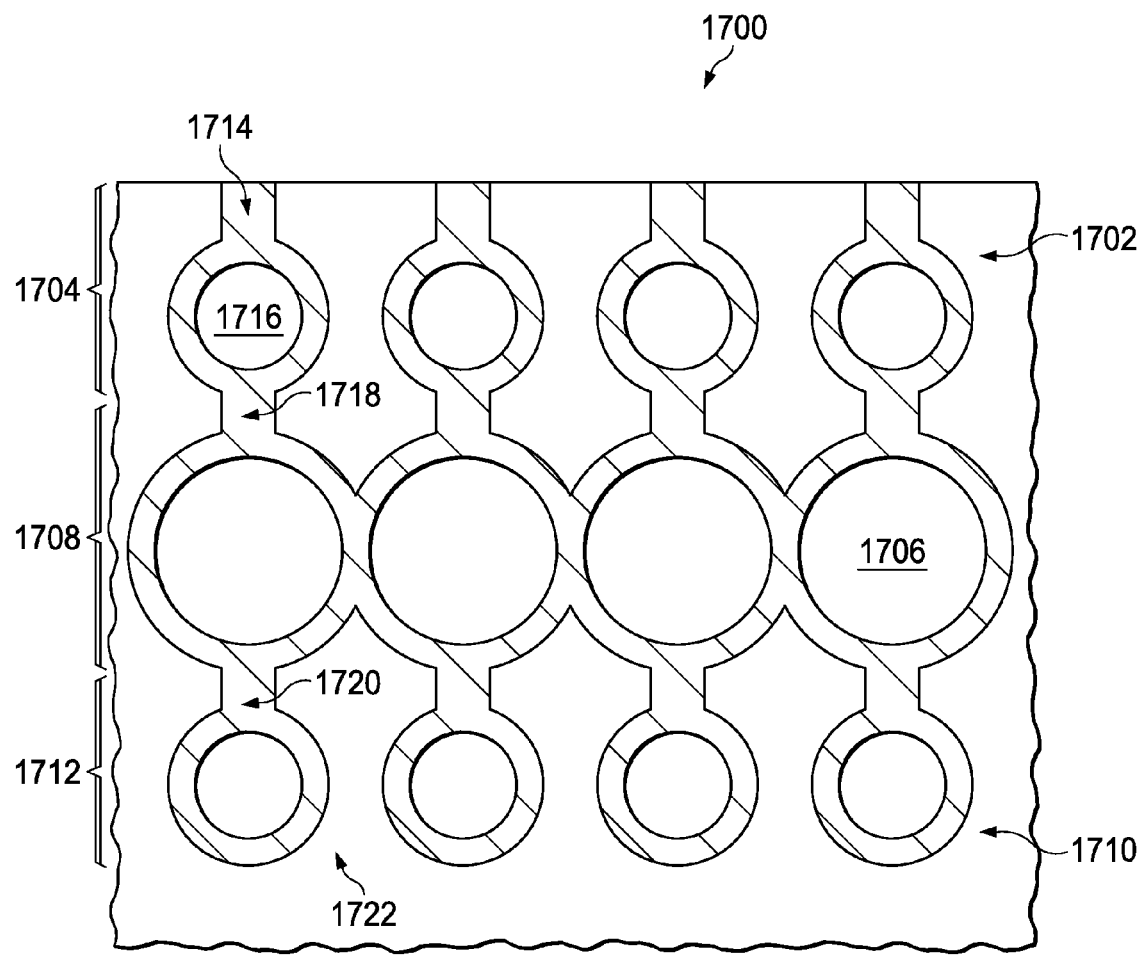
FIG. 17 is yet another illustration of a cross-sectional view of an optical sensor unit in accordance with an illustrative embodiment.

With reference to FIG. 17, yet another illustration of a cross-sectional view of an optical sensor unit is depicted in accordance with an illustrative embodiment. Optical sensor unit 1700 is an example of one physical implementation for optical sensor unit 118 in FIG. 1. In this illustrative example, optical sensor unit 1700 has first reflective structure 1702 in section 1704, sealed cavities 1706 in section 1708, and second reflective structure 1710 in section 1712.

First reflective structure 1702 includes channels 1714, cavities 1716, and channels 1718. These structures are arranged in three layers in this illustrative example. Second reflective structure 1710 includes channels 1720 and cavities 1722 arranged in two layers.

In this illustrative example, cavities 1706 are present in place of a single cavity as shown in other examples. Cavities 1706 may provide a more robust structure for optical sensor unit 1700. In other words, cavities 1706 may result in an increase in strength of the structure that forms the sensor unit. With increased strength, changes in pressure become less sensitive. As a result, other parameters such as temperature and refractive index may be more easily identified.

The different components shown in FIGS. 3-17 may be combined with components in FIGS. 1-2, used with components in FIGS. 1-2, or a combination of the two. Additionally, some of the components in FIGS. 3-17 may be illustrative examples of how components shown in block form in FIGS. 1-2 can be implemented as physical structures.

Figure 18:
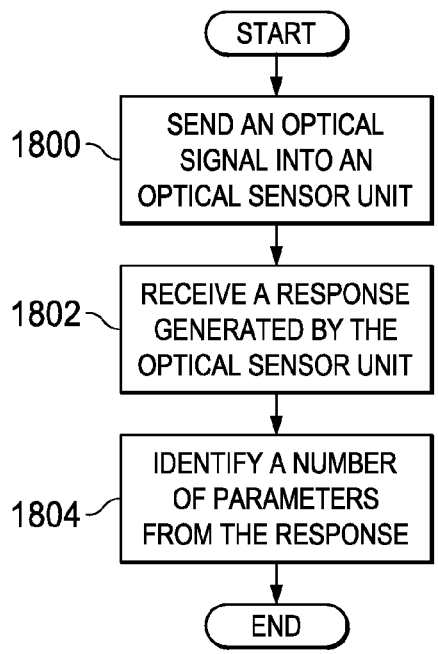
FIG. 18 is an illustration of a flowchart of a process for detecting a number of parameters in accordance with an illustrative embodiment.

With reference now to FIG. 18, an illustration of a flowchart of a process for detecting a number of parameters is depicted in accordance with an illustrative embodiment. The process illustrated in FIG. 18 may be implemented using sensor system 104 with optical sensor units 114 in FIG. 1.

The process begins by sending an optical signal into an optical sensor unit (operation 1800). The process then receives a response generated by the optical sensor unit (operation 1802). Thereafter, a number of parameters are identified from the response (operation 1804) with the process terminating thereafter.

Figure 19:
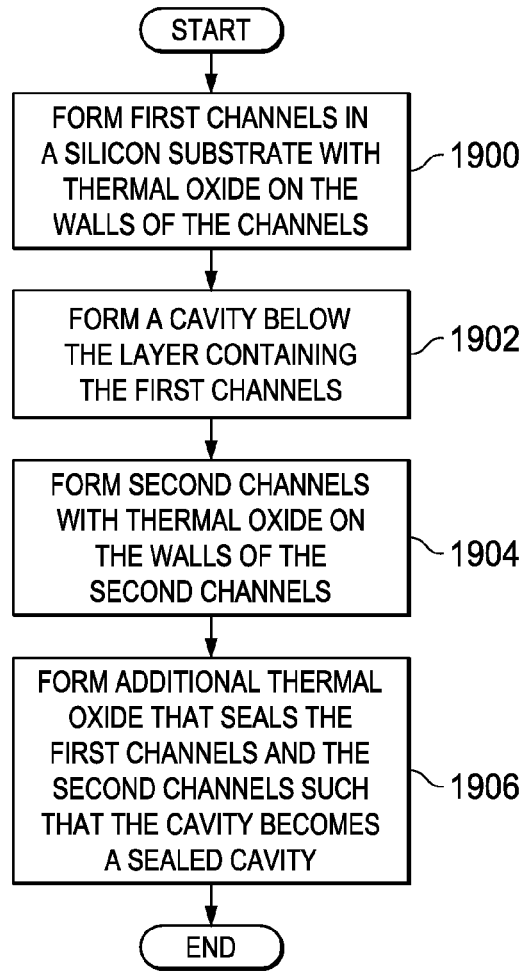
FIG. 19 is an illustration of a flowchart of a process for forming an optical sensor unit in accordance with an illustrative embodiment.

Turning next to FIG. 19, an illustration of a flowchart of a process for forming an optical sensor unit is depicted in accordance with an illustrative embodiment. The different operations illustrated in this flowchart may be used to form optical sensor unit 118 in FIG. 1.

The process begins by forming first channels in a silicon substrate with thermal oxide on the walls of the channels (operation 1900). The channels may be formed using reactive ion etching in this illustrative example. The layer in which these channels are located is part of the first reflective structure.

The process then forms a cavity below the layer containing the first channels (operation 1902).

The process then forms second channels, with thermal oxide on the walls of the second channels (operation 1904). This operation also forms thermal oxide in the cavity. This thermal oxide on the upper portion of the cavity is part of the first reflective structure. The thermal oxide on the lower portion of the cavity is part of the second reflective structure.

The channels are aligned with the channels in the upper layer above the cavity. The layer in which these second channels are located is part of the second reflective structure.

The process then forms additional thermal oxide that seals the first channels and the second channels such that the cavity becomes a sealed cavity (operation 1906) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, additional operations may be performed in forming the optical sensor unit in the flowchart in FIG. 19. These additional operations may include forming additional cavities in the first reflective structure and the second reflective structure.

Figure 20:
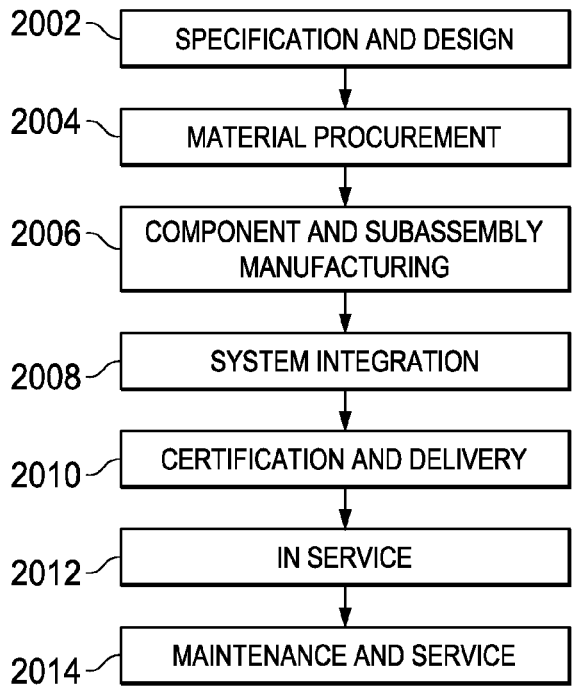
FIG. 20 is an illustration of a block diagram of an aircraft manufacturing and service method in accordance with an illustrative embodiment.
Figure 21:
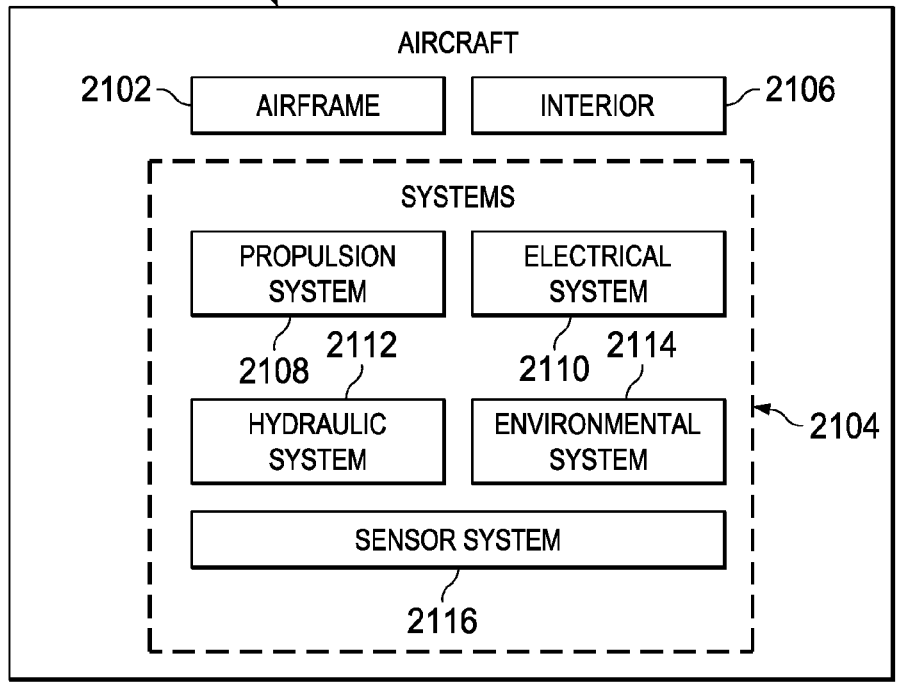
FIG. 21 is an illustration of a block diagram of an aircraft in which an illustrative embodiment may be implemented.

Illustrative embodiments may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 take place. Thereafter, aircraft 2100 in FIG. 21 may go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, environmental system 2114, and sensor system 2116. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 may be fabricated or manufactured in a manner similar to components or subassemblies produced while aircraft 2100 is in service 2012 in FIG. 20. As yet another example, one or more apparatus embodiments, method embodiments, or a combination thereof may be utilized during production stages, such as component and subassembly manufacturing 2006 and system integration 2008 in FIG. 20. For example, optical sensor units may be manufactured and installed in sensor system 2116 during component and subassembly manufacturing 2006 and system integration 2008.

One or more apparatus embodiments, method embodiments, or a combination thereof may be utilized while aircraft 2100 is in service 2012 and/or during maintenance and service 2014 in FIG. 20. For example, optical sensor units may be used to detect various parameters in different areas of aircraft 2100, such as fuel tanks, engines, auxiliary power units, a passenger cabin, or other suitable areas of aircraft 2100. As another example, optical sensor units may be installed during upgrade, refurbishment, brother maintenance in maintenance and service 2014. The use of a number of the different illustrative embodiments may substantially expedite the assembly of and/or reduce the cost of aircraft 2100.

Thus, with optical sensor units such as those illustrated in the different figures, a reduction in the size and weight of sensor systems in aircraft may be achieved as compared to using electrical sensors. Further, the optical sensor units do not need shielding her grounding and are not affected by electromagnetic interference.

The illustrative embodiments may be especially useful in different areas of an aircraft such as a fuel tank, engine, or some other suitable area. Further, with the use of optical sensors, the amount of power needed to operate a sense system also may be reduced.

Further, with an optical sensor unit being able to detect multiple parameters, holes formed in a fuel tank to provide information about the parameters may be reduced. Further, with shielding and other isolation being unnecessary as compared to electrical sensors, the complexity in the design and installation of sensor systems may be reduced for an aircraft.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    an optical sensor unit comprising:
        a first reflective structure configured to be associated with an optical fiber;
        a second reflective structure; and
        a cavity system located between the first reflective structure and the second reflective structure;
    wherein the cavity system is a sealed cavity system;
    wherein the first reflective structure and the cavity system include a second cavity and a first channel between the first reflective structure and the cavity system; and
    wherein the second reflective structure and the cavity system include a third cavity and a second channel between the second reflective structure and the cavity system.

2. The apparatus of claim 1, wherein the optical sensor unit is configured to generate a response to an optical signal including information about a temperature, a pressure, and a refractive index.

3. The apparatus of claim 1, wherein the cavity system is comprised of a group of cavities.

4. The apparatus of claim 1, wherein the first reflective structure, the second reflective structure, and the cavity system are formed on a substrate selected from one of a silicon substrate and a silicon on insulator substrate.

5. The apparatus of claim 1, wherein the optical fiber is selected from one of a multimode optical fiber and a single mode optical fiber.

6. The apparatus of claim 1, further comprising:
    a measurement system configured to send an optical signal into the optical sensor unit through the optical fiber and detect a response to the optical signal generated by the optical sensor unit.

7. The apparatus of claim 1, wherein the first reflective structure is configured to generate information about a temperature.

8. The apparatus of claim 1, wherein the second reflective structure is configured to generate information about a pressure.

9. The apparatus of claim 1, wherein the first reflective structure, the second reflective structure, and the cavity system are configured to generate information about a refractive index.

10. The apparatus of claim 1, wherein the first reflective structure and the second reflective structure are each selected from one of a photonic crystal mirror, a layer of metal, a layer of dielectric, a grating, a Bragg grating, and a membrane.

11. An optical sensor unit comprising:
    a first photonic crystal mirror;
    a second photonic crystal mirror; and
    a sealed cavity located between the first photonic crystal mirror and the second photonic crystal mirror;
    wherein the first photonic crystal mirror and the sealed cavity include a second cavity and a first channel between the first photonic crystal mirror; and
    wherein the second photonic crystal mirror and the sealed cavity include a third cavity and a second channel between the second photonic crystal mirror and the sealed cavity.

12. The optical sensor unit of claim 11 further comprising: an optical fiber associated with the first photonic crystal mirror.

13. The optical sensor unit of claim 11, wherein the first photonic crystal mirror is configured to generate information about a temperature.

14. The optical sensor unit of claim 11, wherein the second photonic crystal mirror is configured to generate information about a pressure.

15. The optical sensor unit of claim 11, wherein the first photonic crystal mirror, the second photonic crystal mirror, and the sealed cavity are configured to generate information about a refractive index.

16. A method for detecting a group of parameters, the method comprising:
sending an optical signal into an optical sensor unit comprising a first reflective structure configured to be associated with an optical fiber, a second reflective structure, and a cavity system located between the first reflective structure and the second reflective structure;
detecting a response generated by the optical sensor unit; and
identifying the group of parameters from the response;
wherein the first reflective structure and the cavity system include a second cavity and a first channel between the first reflective structure and the cavity system; and
wherein the second reflective structure and the cavity system include a third cavity and a second channel between the second reflective structure and the cavity system.

17. The method of claim 16, wherein the group of parameters is selected from a temperature, a pressure, and a refractive index.

18. The method of claim 16, wherein the optical sensor unit is located in an aircraft.

19. The apparatus of claim 1, wherein the first reflective structure is sensitive to a change in temperature and the second reflective structure is sensitive to a change in pressure.

20. The apparatus of claim 1, wherein the cavity system comprises a single cavity.

* * * * *